United States Patent [19]
Krofchak

[11] Patent Number: 6,033,467
[45] Date of Patent: Mar. 7, 2000

[54] METHOD OF MAKING CEMENT OR MINE BACKFILL FROM BASE METAL SMELTER SLAG

[75] Inventor: David Krofchak, Copper Cliff, Canada

[73] Assignee: Fenicem Minerals Inc., Copper Cliff, Canada

[21] Appl. No.: 09/074,793

[22] Filed: May 8, 1998

Related U.S. Application Data

[63] Continuation-in-part of application No. 08/756,861, Nov. 26, 1996, Pat. No. 5,749,962, which is a continuation-in-part of application No. 08/494,665, Jun. 26, 1995, Pat. No. 5,593,493.

[51] Int. Cl.⁷ .......................... C04B 7/147; C04B 7/153; C04B 7/19
[52] U.S. Cl. .......................... 106/714; 106/789; 106/767; 106/816; 106/737; 106/736
[58] Field of Search ..................................... 106/714, 736, 106/737, 789, 816, 767

[56] References Cited

U.S. PATENT DOCUMENTS

| | | | |
|---|---|---|---|
| 4,306,912 | 12/1981 | Fross ........................................ | 106/714 |
| 5,076,851 | 12/1991 | Skovara et al. .......................... | 106/714 |
| 5,393,342 | 2/1995 | Hooykass ................................. | 106/714 |
| 5,395,441 | 3/1995 | Bogdan et al. .......................... | 106/714 |
| 5,593,493 | 1/1997 | Krofchak ................................. | 106/714 |
| 5,749,962 | 5/1998 | Krofchak ................................. | 106/714 |
| 5,810,922 | 9/1998 | Okamoto et al. ........................ | 106/714 |

*Primary Examiner*—Michael Marcheschi
*Attorney, Agent, or Firm*—Robert F. Delbridge

[57] ABSTRACT

A method of making cement from base metal smelter slag produced by nickel, copper, lead or zinc smelter, includes grinding the slag with clinker and blast furnace slag to a size in the range of from about −250 to about 425 mesh to produce ground slag cement, and mixing the ground slag cement with Portland cement in a ratio of at least about 0.5:1 by weight to produce a blended cement.

7 Claims, No Drawings

METHOD OF MAKING CEMENT OR MINE BACKFILL FROM BASE METAL SMELTER SLAG

This application is a continuation-in-part of application Ser. No. 08/756,861 filed Nov. 26, 1996, U.S. Pat. No. 5,749,962 which is a continuation-in-part of application Ser. No. 08/494,665 filed Jun. 26, 1995, now U.S. Pat. No. 5,593,493 issued Jan. 14, 1997.

FIELD OF THE INVENTION

This invention relates to the treatment of base metal (copper, nickel, lead or zinc) smelter slag to produce a slag cement for use in making concrete or mine backfill.

BACKGROUND OF THE INVENTION

In Canada, the recovery of copper, nickel, lead and zinc from their ores produces over twelve million tons of slag per year. Since about 1900, some slags have been used for rail ballast, but usually large slag heaps have accumulated near the smelters. In recent years, at various mines in Europe and Australia, some smelter slags (usually copper smelter slags) have been ground to about −250 mesh and mixed with regular Portland cement to produce a blended cement for use in cemented mine backfill.

During the 1980's the pozzolanic (i.e. cementing) properties of Canadian smelter slags were studied to evaluate the feasibility of their use as a partial replacement for regular Portland cement and mine backfill. It was concluded that these slags could be so used. However, the results were much inferior to those obtained with regular Portland cement. For example, steel blast furnace slag mixtures only provided approximately 70% of the strength obtained by use of regular Portland cement or regular Portland cement/steel blast furnace slag mixtures. Consequently the work was discontinued, it also having been found that the economics, including transportation costs, were not favourable.

It has recently been found that large slap heaps are leaching unacceptably high amounts of heavy metal values, and mining companies are seeking acceptable solutions to this ground problem. Also, environmental authorities are requiring that plans be formulated for long term permanent solutions.

It is therefore an object of this invention to provide a method of using base metals smelter slag to produce a cement for general construction purposes, including mine backfill, whose properties will be equal to or better than those of regular Portland cement or regular Portland cement/ blast furnace slag mixtures.

SUMMARY OF THE INVENTION

According to one aspect of the invention, a method of making cement from base metal smelter slag produced by a nickel, copper lead or zinc smelter said slag containing by weight from about 15 to 40% silica ($SiO_2$), from about 35 to about 60% iron oxide ($Fe_2O_3$) and from about 2 to about 20% calcium oxide (CaO), comprises grinding the base metal smelter slag with clinker and blast furnace slag to a size in the range of from about −250 to about 425 mesh to produce ground slag cement, and mixing the ground slag cement with Portland cement in a ratio of at least about 0.5:1 by weight.

The ground slag cement may be mixed with Portland cement in the range of from about 0.5:1 to about 1.5:1 or from about 1.25:1 to about 1.75:1. The ground slag cement may be mixed with Portland cement in the ratio of from about 2.5:1 to dispose of extra slag without reducing compressive strength below acceptable ASTM standards. The Portland cement may be normal (i.e. regular) Portland cement or high early strength (Type 3) Portland cement. Sand, stone and water may be added to the blended cement to produce concrete.

According to another aspect of the invention, from about 2% to about 60% by weight of a flocculant agent, and tailings or sand are added to the ground slag cement which is then mixed with tailings or sand to produce a binder for mine backfill superior to that obtained with regular Portland cement or Portland cement/steel blast furnace slag cement mixtures. The flocculating agent may be calcium aluminum silicate activated by sulfuric acid, which is readily available from the treatment of metal sulfides in the process of recovering base metals from the ore.

The utilization of base metal smelter slag to produce cement and mine backfill substantially completely solves the environmental leach problem of heavy metals, while at the same time providing a valuable and practical use for the slag. The prior art teaches that tying up heavy metals as metal silicates renders them insoluble in water and thereby non-leachable, and this occurs with the present invention since clinker blast furnace slag and Portland cement contains tri-silicate, di-calcium silicate and calcium aluminate with react with these metals. Thus, with the present invention, the tying up of heavy metals as metal silicates is automatically accomplished while making concrete or mine backfill. In the case of mine backfill, even the sulfur which was previously present in the ore before the mining process goes back to the mine where it came from, bonded permanently in the form of giant insoluble silicate.

Various examples of the invention will now be described.

EXAMPLE 1

A composite sample of base metal smelter slag was obtained from a slag heap which has been accumulated over 50 years from one of the world's largest nickel producers located in Sudbury, Ontario, Canada. The sample was ground to −325 mesh and was analyzed as follows: (by weight)

| | | | |
|---|---|---|---|
| $SiO_2$ | 35.66% | $TiO_2$ | 0.32% |
| $Al_2O_3$ | 5.59% | MnO | 0.07% |
| $Fe_2O_3$ | 53.00% | Co | 0.20% |
| CaO | 2.75% | Cu | 0.20% |
| MgO | 2.53% | Ni | 0.40% |
| $Na_2O$ | 0.87% | S | 1.46% |
| K2O | 0.65% | | |

The specific gravity of 3.67 (the specific gravity of Portland cement being about 3.14). Since the American Society for Testing and Materials (ASTM) has established a procedure for evaluating acceptable quality standards for slag cements for use in concrete and mortars (C989), this procedure has been followed so that the results conform to standards of acceptance in the concrete industry. The procedure calls for 2" cubes to made using graded sand and cement as a reference sample, and identical cubes made with graded sand and the new blend of 25% clinker, 40% granulated ground blast furnace slag and 35% base metal stag.

ASTM standards require a slag activity index of at least 70%, calculated as follows:

$$\text{Slag activity index} = \frac{\text{Slag Cube strength}}{\text{Reference Cube strength}} \times 100$$

Compressive Strength Test:

|  | Cement | Ottawa Sand | Base Metal Slag | Blast Furnace Slag | Clinker | Water | Compressive Strength psi | |
|---|---|---|---|---|---|---|---|---|
|  | gm | gm | gm | gm | gm | gm | gm | gm |
|  | 500 | 1375 | — | — | — | 250 | 3813.5 | 6018.8 |
| Blend | — | 1375 | 175 | 200 | 125 | 250 | 1332.3 | 4463.8 |

From these tests, it is clear that the cubes made from the blend of base metal smelter slag, blast furnace slag and clinker exceed the minimum 70% requirement to meet ASTM standards for use in concrete and mortars. The cement was Type 1 (regular) Portland cement for the control.

EXAMPLE 2

The same proportions of base metal smelter slag, blast furnace slag and clinker were mixed to provide a cementitious material to use as a binder for tailings in mine backfill. A flocculant agent was added to activate the blend. 2"×4" cylinders were made and compared to the control composed of Type 1 Portland cement and blast furnace slag.

The blend according to the invention is clearly superior to the control and shows that the invention is technically very successful. The water content in the tailings was 32% in order to enable it to be pumped back into the mine without plugging the pipes through which it flows. The cement:tailing ratio was 1:10.

EXAMPLE 3

This example is the same as in Example 2 except that 4"×8" cylinders were used, these being more representative for testing mine backfill.

Compressive Strength Test

|  | Cement | Tailing Metal | Base Metal Slag | Blast Furnace Slag | Clinker | Flocc. Agent | Compressive Strength psi | | |
|---|---|---|---|---|---|---|---|---|---|
|  | gm | gm | gm | gm | gm | gm | 3 day | 7 day | 28 |
|  | 14.45 | 2125 | — | — | — | — | 0 | 74.5 | 123.4 |
| Blend | — | 2125 | 36.1 | 57.8 | 50.6 | 28.9 | 28.3 | 82.2 | 146.2 |

Compressive Strength Test

|  | Cement | Tailing | Base Metal Slag | Blast Furnace Slag | Clinker | Flocc. | Compressive Strength psi | | |
|---|---|---|---|---|---|---|---|---|---|
|  | gm | gm | gm | gm | gm | gm | 3 day | 7 day | 28 day |
|  | 108.8 | 16000 | — | 979.2 | — | — | 9.1 | 36.5 | 78.3 |
| Blend | — | 16000 | 380.8 | 435.2 | 272 | 54.4 | 35.4 | 78.2 | 176.4 |

Again, the water content in the tailings was 32% in order to enable it to be pumped back to the mine without plugging the pipes through which it passes, and the cement/tailing ratio was 1:10.

EXAMPLE 4

Various tests were made with increasing amount of sulfuric acid relate to the flocculating agent and the blend of base metal smelter slag, blast furnace slag and clinker.

|    | Cement | Tailing | Base Metal Slag | Blast Furnace Slag | Clinker | Flocc. | Compressive Strength psi | | |
|----|--------|---------|-----------------|--------------------|---------|--------|-------|-------|--------|
|    |        |         | Mix Proportion  |                    |         |        |       |       |        |
|    | gm     | gm      | gm              | gm                 | gm      | gm     | 3 day | 7 day | 28 day |
| #1 | 0      | 16000   | 380.8           | 435.2              | 272     | 54.4   | 9.1   | 12.6  | 35.4   |
| #2 | 21.6   | 16000   | 380.8           | 435.2              | 272     | 54.4   | 12.7  | 20.6  | 60.5   |
| #3 | 32.8   | 16000   | 380.8           | 435.2              | 272     | 54.4   | 16    | 22.8  | 67.4   |
| #4 | 43.6   | 16000   | 380.8           | 435.2              | 272     | 54.4   | 18.3  | 29.7  | 85.7   |
| #5 | 87.2   | 16000   | 380.8           | 435.2              | 272     | 54.4   | 35.4  | 78.2  | 176.4  |
| #6 | 130.4  | 16000   | 380.8           | 435.2              | 272     | 54.4   | 1.1   | 6.9   | 218.7  |

It is clear that blend no. 5 is the most suitable, since it has the highest strength in the early days and satisfactory strength in the long term.

EXAMPLE 5

This sample was cured at 30° C. for 24 hours the second day, in order to simulate conditions underground. The strength of 3 days was 61.7 psi and at 7 days was 121.6 psi.

EXAMPLE 6

To show the importance of the three components of the blend, 2"×4" cylinders were made and tested after three days. The results were as follows:

|    | Tailing | Base Metal Slag | Blast Furnace Slag | Clinker | Flocc. Agent | Compressive Strength psi |
|----|---------|-----------------|--------------------|---------|--------------|--------------------------|
|    |         | Mix Proportion  |                    |         |              |                          |
|    | gm      | gm              | gm                 | gm      | gm           | 3 Day                    |
| #1 | 531.3   | —               | 14.4               | 9.0     | 54.4         | 18.3                     |
| #2 | 531.3   | 12.6            | —                  | 23.5    | 54.4         | 18.3                     |
| #3 | 531.3   | 12.6            | 23.5               | —       | 54.4         | 0                        |
| #4 | 531.3   | 12.6            | 14.4               | 9.0     | 54.4         | 29.7                     |

The method according to this invention has advantageously made use of base metal smelter slag to make high strength binder for tailings in mine backfill, superior to the regular control, while solving a growing and perplexing environmental problem. Thus, a economical and viable solution has been invented for disposal or recycling of the waste material as a cement for mine backfill.

Other embodiments and examples of the invention will be readily apparent to a person skilled in the art, the scope of the invention being defined in the appended claims.

I claim:

1. A method of making cement from base metal smelter slag produced by nickel, copper, lead or zinc smelter, said slag containing by weight from about 15 to 40% silica ($SiO_2$), from about 35 to about 60% iron oxide ($Fe_2O_3$) and from about 2 to about 20% calcium oxide (CaO), comprising:

grinding the base metal smelter slag with clinker and blast furnace slag to a size in the range of from about −250 to about 425 mesh to produce ground slag cement, and mixing the ground slag cement with Portland cement in a ratio of at least about 0.5:1 by weight to produce a blended cement.

2. A method according to claim 1 wherein the ground slag cement is mixed with Portland cement in a ratio of from about 0.5:1 to about 1.5:1 by weight to produce the blended cement.

3. A method according to claim 1 wherein the ground slag cement is mixed with Portland cement in a ratio of from about 1.25:1 to about 1.75:1 by weight to produce the blended cement.

4. A method according to claim 1 wherein the ground slag cement is mixed with Portland cement in a ratio up to about 2.5:1 to dispose of extra slag.

5. A method according to claim 1 wherein sand, stone and water are added to the blended cement to produce concrete.

6. A method of making a binder for mine backfill from base metal smelter slag, said slag being produced by a nickel, copper, lead or zinc smelter and containing 15 to 40% silica ($SiO_2$) from about 35 to about 60% iron oxide ($Fe_2O_3$) and from about 2 to about 20% calcium oxide (CaO), comprising:

grinding the base metal smelter slag with clinker and blast furnace slag to a size in the range of about −250 to about 425 mesh to produce ground slag cement, and adding from about 2% to about 60% by weight of a flocculating agent and tailings or sand to produce a binder for mine backfill.

7. A method according to claim 6 wherein the flocculating agent comprises calcium aluminum sulfate activated by sulfuric acid.

* * * * *